United States Patent [19]
Scott et al.

[11] Patent Number: 5,935,286
[45] Date of Patent: Aug. 10, 1999

[54] METHOD AND APPARATUS FOR DELIVERING A CASED GLASS STREAM

[75] Inventors: Garrett L. Scott, Toledo; Michael T. Dembicki, Pemberville, both of Ohio

[73] Assignee: Owens-Brockway Glass Container Inc., Toledo, Ohio

[21] Appl. No.: 08/822,629

[22] Filed: Mar. 21, 1997

[51] Int. Cl.$^6$ ................................ C03B 5/26; C03B 7/08
[52] U.S. Cl. ................................ 65/121; 65/126; 65/129; 65/145; 65/325
[58] Field of Search ............................. 65/121, 122, 126, 65/128, 129, 135.1, 145, 146, 179, 180, 325, 326, 327, 328, 330, 346, 331, 347

[56] References Cited

U.S. PATENT DOCUMENTS

| | | |
|---|---|---|
| 1,845,635 | 2/1932 | Soubier . |
| 1,919,259 | 7/1933 | Said . |
| 2,072,807 | 3/1937 | Bailey . |
| 2,128,249 | 8/1938 | Honiss . |
| 2,141,425 | 12/1938 | Wadsworth . |
| 2,340,729 | 2/1944 | Barker, Jr. . |
| 2,485,808 | 10/1949 | Berthold . |
| 3,269,821 | 8/1966 | Vatterodt . |
| 4,087,268 | 5/1978 | Lentz . |
| 4,217,123 | 8/1980 | Titchmarsh . |
| 4,230,476 | 10/1980 | Vischer . |
| 4,740,401 | 4/1988 | Barkhau et al. . |
| 4,784,679 | 11/1988 | Lentz . |
| 5,318,620 | 6/1994 | Buettiker . |
| 5,393,472 | 2/1995 | Shaw . |
| 5,735,925 | 4/1998 | Scott . |

FOREIGN PATENT DOCUMENTS

| | | |
|---|---|---|
| 74254 | 12/1994 | Czech Rep. . |
| 0 722 908 A2 | 7/1996 | European Pat. Off. . |
| 1020181 | 2/1953 | France . |
| 1223064 | 1/1960 | France . |
| 598898 | 6/1934 | Germany . |
| 4124390A1 | 2/1992 | Germany . |
| 1390204A1 | 4/1988 | U.S.S.R. . |
| 690023 | 4/1953 | United Kingdom . |

OTHER PUBLICATIONS

M. Stanley, "Modelling For A New Feeder Bowl", Glass Technology, Feb. 1, 1994.

*Primary Examiner*—Steven P. Griffin

[57] ABSTRACT

Apparatus for forming a cased glass stream having an inner core glass surrounded by an outer casing glass includes a first orifice for receiving core glass from a first source, and a second orifice vertically spaced beneath and aligned with the first orifice. A chamber surrounds the second orifice and communicates with the second orifice through a metering gap between the first and second orifices. Casing glass is delivered from a second source to one side of the chamber such that glass flows by gravity from both the first and second sources through the orifices to form the cased glass stream. In accordance with one aspect of the present invention, the metering gap is of non-uniform dimension around the chamber, providing greater resistance to glass flow through the metering gap on a side thereof adjacent to the side of the chamber that receives casing glass from the second source and less resistance to glass flow through the metering gap on the side thereof remote from the side of the chamber that receives the casing glass.

14 Claims, 2 Drawing Sheets

METHOD AND APPARATUS FOR DELIVERING A CASED GLASS STREAM

The present invention is directed to delivery of a glass stream for forming glass charges or gobs for glassware manufacture, and more particularly to a method and apparatus for delivering a so-called cased glass stream in which an inner or core glass is surrounded by an outer or casing glass layer.

BACKGROUND AND SUMMARY OF THE INVENTION

It has heretofore been proposed to provide a cased glass stream for forming glassware having layered wall segments. U.S. application Ser. Nos. 08/374,371 and 08/374,372, both now abandoned, disclose techniques for delivering such a cased glass stream in which core glass from a first source is delivered through a first orifice. A second orifice is vertically spaced beneath and aligned with the first orifice, and is surrounded by an annular chamber that communicates with the second orifice through the gap between the first and second orifices. A heated tube delivers casing glass from a second glass source to the annular chamber that surrounds the second orifice. Glass flows by force of gravity from the first and second sources through the first and second orifices in such a way that a cased glass stream emerges from the second orifice. This cased glass stream may be sheared by conventional techniques to form individual cased glass gobs for delivery to conventional individual section glassware forming machines.

Although the techniques disclosed in the noted patent applications address and overcome problems theretofore extant in the art, further improvements remain desirable. For example, a problem remains concerning uniformity of distribution of casing glass thickness around the circumference of the core glass stream. Above-referenced application Ser. No. 08/374,372, now abandoned, teaches that the dimensions of the metering gap between the first and second orifices, both in the direction parallel to glass flow therethrough and the direction perpendicular to glass flow therethrough, are chosen to provide uniform flow resistance to casing glass flow at all points circumferentially around each gap. In the preferred embodiments disclosed in that application, the dimensions of each gap, both parallel and perpendicular to glass flow, are uniform around the gap. In implementation of this technique, it has been found that the casing glass can vary in thickness by a ratio of up to 2/1 around the circumference of the core glass stream.

It is therefore a general object of the present invention to provide a method and apparatus for delivering a cased glass stream of the character disclosed in the above-noted applications that obtain improved uniformity of casing glass thickness around the circumference of the cased glass stream. Another and more specific object of the present invention is to provide a method and apparatus of the described character in which the metering gap between the aligned orifices is dimensioned with respect to the surrounding chamber and the feed from the source of casing glass so as to provide a more uniform resistance to casing glass flow throughout the entire casing glass flow path—i.e., from the casing glass feed around the chamber and through the metering gap. A further object of the present invention is to provide a method and apparatus of the described character in which a plurality of cased glass streams are formed by feeding core and casing glass through a plurality of orifice pairs surrounded by the casing glass chamber, and in which the metering gaps between all pairs of orifices are dimensioned with respect to each other and with respect to the surrounding chamber and the casing glass feed so as to provide substantially uniform and identical casing glass thickness at all of the cased glass streams.

Apparatus for forming a cased glass stream having an inner core glass surrounded by an outer casing glass includes a first orifice for receiving core glass from a first source, and a second orifice vertically spaced beneath and aligned with the first orifice. A chamber surrounds the second orifice and communicates with the second orifice through a metering gap between the first and second orifices. Casing glass is delivered from a second source to one side of the chamber such that glass flows by gravity from both the first and second sources through the orifices to form the cased glass stream. In accordance with one aspect of the present invention, the metering gap between the orifices is of non-uniform dimension around the chamber, providing greater resistance to glass flow through the metering gap on a side thereof adjacent to the side of the chamber that receives casing glass from the second source and less resistance to glass flow through the metering gap on the side thereof remote from the side of the chamber that receives the casing glass.

In the preferred embodiments of the present invention, the metering gap between the orifices is dimensioned such that resistance to glass flow varies as a predetermined function of angle preferably a uniform function of angle, around the annular chamber and the metering gap. The dimension of the metering gap parallel to glass flow most preferably remains constant around the metering gap, while the dimension perpendicular to glass flow varies as a function of angle around the gap. Most preferably, the dimension of the metering gap perpendicular to glass flow varies by forming the opposed gap surfaces on angulated planes, so that this dimension varies trigonometrically around the gap.

In an implementation of the present invention having a plurality of first and second orifices disposed in aligned pairs and each separated by an associated metering gap, with all of the orifice pairs being surrounded by the casing glass chamber, at least one of the metering gaps is dimensioned differently from the other metering gaps to equalize resistance to glass flow as between or among the metering gaps from the source of casing glass through the chamber. In the preferred implementation of this aspect of the invention, three orifice pairs are disposed in a line parallel to the side of the chamber coupled to the source of casing glass. The metering gap at the center of the orifice pairs is dimensioned on a side thereof remote from the casing glass feed to provide less resistance to glass flow than at the corresponding sides of the other two orifice pairs. In this way, there is improved uniformity of resistance to glass flow from the casing glass feed through and around the chamber to both the front and back sides of the various metering gaps.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
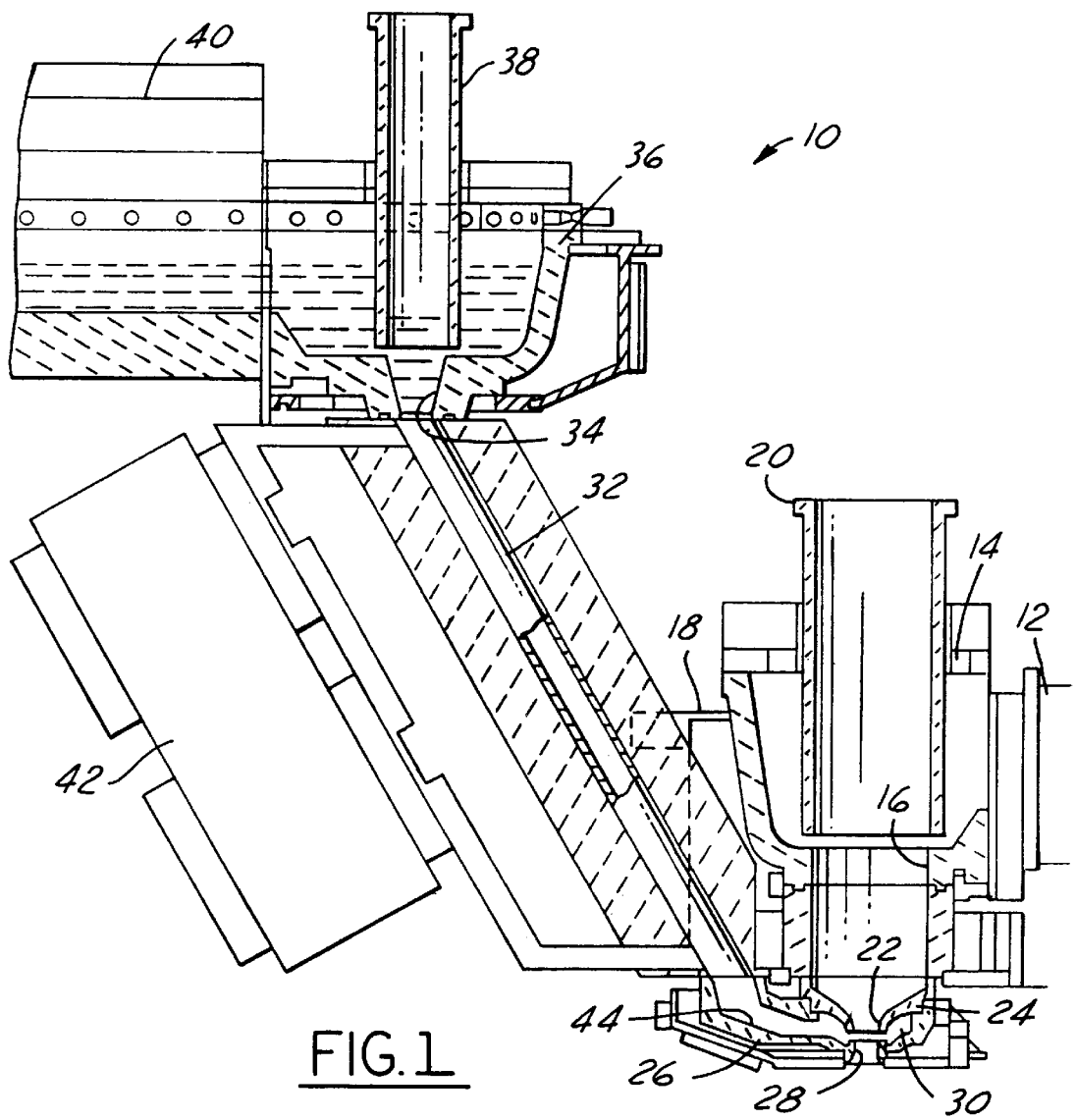
FIG. 1 is a fragmentary elevational schematic diagram of a glass delivery system in accordance with a presently preferred embodiment of the invention.

FIG. 1 illustrates a system 10 for delivering a stream of cased glass. A first forehearth 12 delivers core glass to a spout 14 that has an opening 16 at the lower end thereof. Spout 14 is surrounded by a protective case 18, preferably constructed of non-magnetic metal such as stainless steel. A tube 20 controls delivery of core glass from spout 14 through opening 16 to and through at least one first orifice 22 carried by an upper orifice ring 24 beneath spout 14. A lower orifice ring 26 carries at least one second orifice 28 positioned beneath orifice(s) 22 and axially aligned therewith. Orifice 28 is surrounded by an annular chamber 30 formed between orifice rings 24, 26. Chamber 30 communicates with orifice 28 by means of a lateral metering space or gap between orifices 22, 28. Annular chamber 30 is coupled by a delivery tube 32 to the opening 34 at the lower end of a casing glass spout 36. Spout 36 includes a delivery control tube 38, and is coupled to a casing glass forehearth 40. Delivery tube 32 is resistance-heated by control electronics 42 for maintaining flow of casing glass to chamber 30. To the extent thus far described, system 10 in FIG. 1 is essentially the same as disclosed in above-noted U.S. application Ser. Nos. 08/374,371 and 08/374,372, both now abandoned. The former of such applications is directed in particular to construction of casing glass delivery tube 32, while the latter of such applications is directed in particular to construction of orifice rings 24, 26. The disclosures of such applications, both of which are assigned to the assignee hereof, are incorporated herein by reference for purposes of background.

Figure 2:
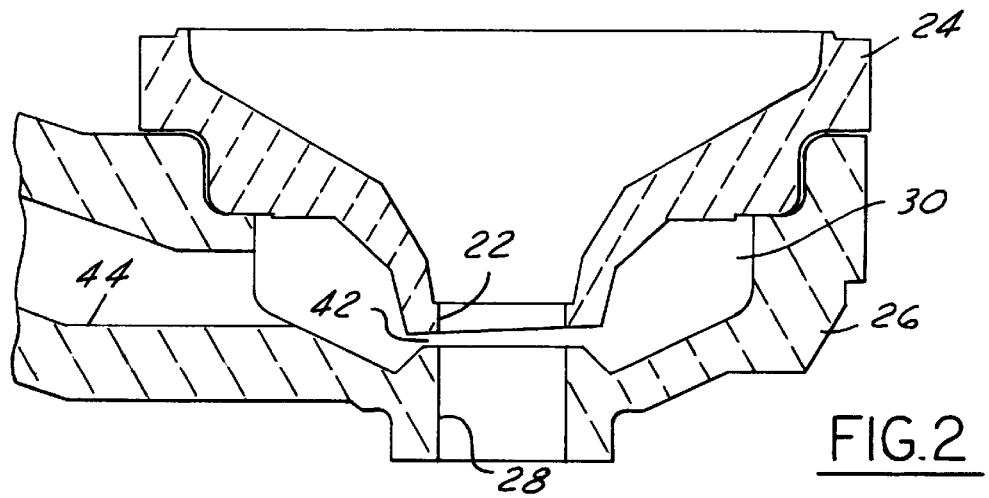
FIG. 2 is a fragmentary sectional view on an enlarged scale of the orifice rings and metering gap in the system of FIG. 1, being taken substantially along the line 2—2 in FIG. 3.

As shown in FIG. 2, the gap 42, which meters flow of casing glass from chamber 30 to orifice 28, has both a first dimension (horizontal in FIG. 2) parallel to the direction of glass flow through gap 42, and a second dimension (vertical in FIG. 2) perpendicular to the direction of glass flow from chamber 30 through gap 42. In accordance with the preferred embodiment of the present invention illustrated in FIG. 2, the second dimension of metering gap 42 perpendicular to glass flow is greater on the side of gap 42 remote from casing glass inlet 44 to chamber 30 than on the side of gap 42 adjacent to the casing glass inlet. Inasmuch as casing glass inlet 44 opens to one side of chamber 30, as opposed to opening entirely around chamber 30, casing glass must flow a greater distance from inlet 44 around chamber 30 to the back side of gap 42 than from inlet 44 directly across chamber 30 to the adjacent front side of metering gap 42. This greater distance of flow results not only in a pressure drop due to frictional resistance, but also heat loss and a temperature drop which increases viscosity. By dimensioning the gap non-uniformly as described immediately above, resistance to glass flow through the metering gap itself at least partially, and preferably substantially completely, compensates for the greater distance of glass travel so as to provide substantially uniform resistance to glass flow throughout the entire glass flow path from inlet 44 through chamber 30 to orifice 28. In the specific embodiment illustrated in FIG. 2, the upper surface of orifice ring 26 surrounding orifice 28 is formed on a horizontal plane, while the opposing lower surface of orifice ring 24 surrounding orifice 22 is formed on a plane angulated with respect to horizontal so that the cross-sectional dimension to glass flow varies trigonometrically from the side of gap 42 adjacent to inlet 44 to the side of gap 42 remote from inlet 44.

Figure 3:
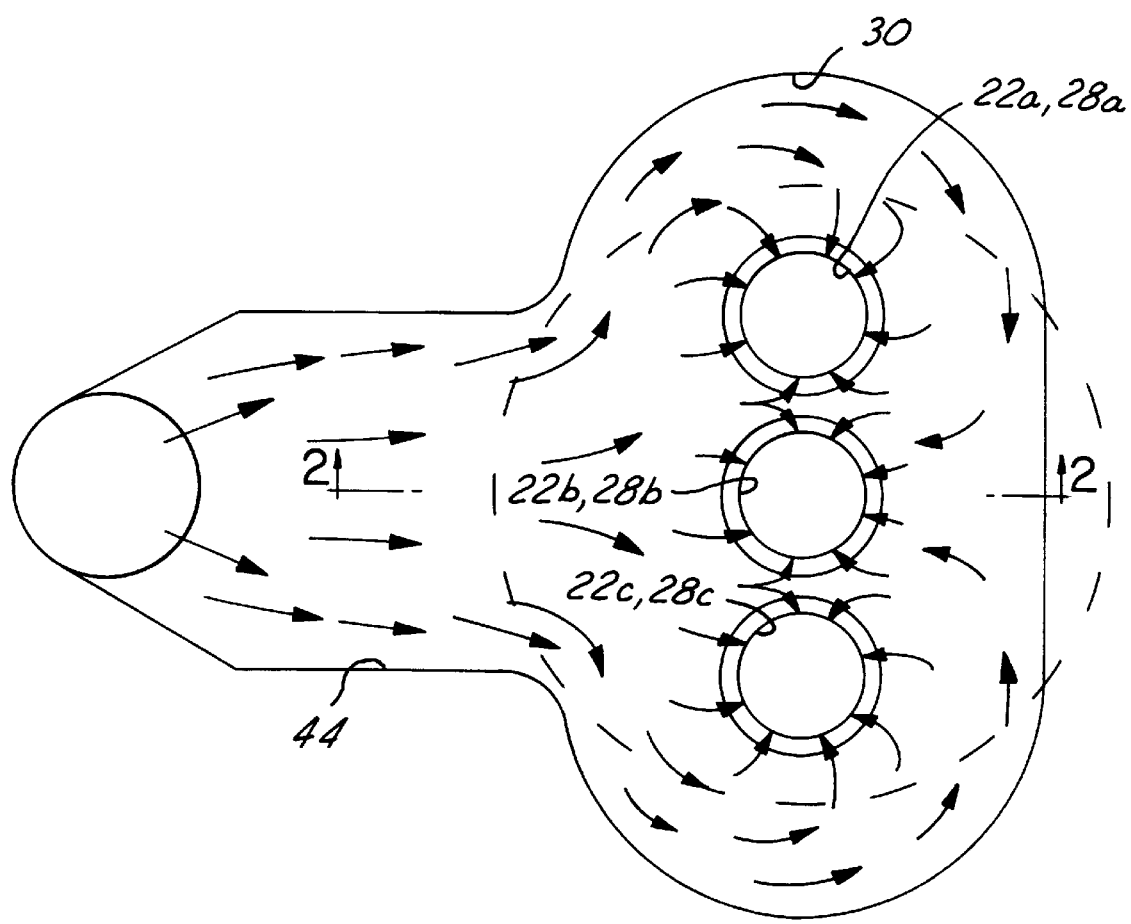
FIG. 3 is a schematic diagram that illustrates glass flow in a three-stream embodiment of the present invention.

FIG. 3 schematically illustrates an embodiment of the present invention for providing three cased glass streams. Three pairs of aligned orifices 22a,28a, 22b,28b and 22c,28c are disposed in a line parallel to the side of chamber 30 into which casing glass inlet 44 opens. It will be appreciated in FIG. 3 that the path of glass travel from inlet 44 around chamber 30 to the back side of orifice pair 22b, 28b is substantially longer than the path of travel to the back sides of pairs 22a, 28a and 22c, 28c. Thus, in this embodiment of the invention, the metering gap of orifice pair 22b, 28b may be dimensioned differently from that of orifice pairs 22a, 28a and 22c, 28c, particularly at the back side of orifice pair 22b, 28b, so as to improve uniformity of resistance to glass flow to all points around all metering gaps, and thereby improve uniformity of deposition of casing glass around the circumferences of the core glass streams.

We claim:

1. Apparatus for forming a cased glass stream having an inner core glass surrounded by an outer casing glass, said apparatus including means for delivering core glass from a first source through a first orifice, means forming a second orifice vertically spaced beneath and aligned with said first orifice with a chamber surrounding said second orifice and communicating with said second orifice through a metering gap between said first and second orifices, and means for delivering casing glass from a second source to one side of said chamber such that glass flows by gravity from said first and second sources through said orifices to form said cased glass stream, said metering gap having a non-uniform dimension around said chamber, providing greater resistance to glass flow through said metering gap on a side thereof adjacent to said one side of said chamber and less resistance to glass flow through said metering gap on a side thereof remote from said one side of said chamber, for providing substantially uniform casing glass thickness around a circumference of the cased glass stream.

2. The apparatus set forth in claim 1 wherein said metering gap is dimensioned such that said resistance to glass flow varies as a predetermined function of angle around said chamber.

3. The apparatus set forth in claim 2 wherein said predetermined function is a uniform function of angle.

4. The apparatus set forth in claim 1 wherein said metering gap has a first dimension parallel to glass flow from said chamber through said gap and a second dimension perpendicular to glass flow from said chamber through said gap, and wherein one of said first and second dimensions is uniform around said gap while the other of said first and second dimensions varies around said gap.

5. The apparatus set forth in claim 4 wherein said first dimension is uniform around said gap and said second dimension varies around said gap.

6. The apparatus set forth in claim 1 wherein said gap has a dimension perpendicular to glass flow through said gap that varies around said gap.

7. The apparatus set forth in claim 6 wherein said metering gap is formed by opposed planar surfaces at said first and second orifices, at least one of said surfaces being angled with respect to alignment of said orifices.

8. The apparatus set forth in claim 1 comprising a plurality of said first and second orifices disposed in aligned pairs each separated by an associated metering gap, with all of said orifice pairs being surrounded by said chamber, and wherein at least one of said metering gaps is dimensioned differently from other of said metering gaps to equalize resistance to glass flow as among said metering gaps from said second source through said chamber.

9. The apparatus set forth in claim 8 comprising three of said orifice pairs including a center pair and two outside pairs disposed in a line parallel to said one side of said chamber, and wherein the metering gap at the center of said pairs is dimensioned on a side thereof remote from said one side of said chamber to provide less resistance to glass flow than at sides of said two outside orifice pairs remote from said one side of said chamber.

10. A method of forming a cased glass stream in which glass from a first source is delivered through a pair of aligned orifices separated by a metering gap and glass from a second source is delivered to a chamber around said metering gap such that glass from said first source merges with glass from said second source by force of gravity through said metering gap to form a casing around an inner core of glass from said first source, said method comprising the step of dimensioning said metering gap non-uniformly around said gap so as to provide less resistance to glass flow on one side of said gap than on another side of said gap, for providing substantially uniform casing thickness around a circumference of the cased glass stream.

11. The method set forth in claim 10 wherein glass from said second source is fed to one side of said chamber, and wherein said metering gap is dimensioned non-uniformly around said gap to provide less resistance to glass flow on a side thereof remote from said one side of said chamber.

12. The method set forth in claim 11 comprising the step of dimensioning said metering gap so as to have a uniform dimension in a direction parallel to glass flow from said chamber through said gap and a non-uniform dimension in a direction perpendicular to glass flow from said chamber through said gap.

13. The method set forth in claim 12 wherein said non-uniform dimension perpendicular to glass flow is formed by opposed planar surfaces at said orifices, at least one of which is angulated with respect to alignment of said orifices.

14. The method set forth in claim 10 in which glass from said first source is delivered to a plurality of pairs of aligned orifices all having metering gaps surrounded by said chamber, wherein the step of dimensioning comprises dimensioning said metering gaps to be unequal to each other so that each said gap provides substantially the same resistance to glass flow through said chamber to and through said gaps.

* * * * *